United States Patent
Steves

[11] 3,878,692
[45] Apr. 22, 1975

[54] AIRCRAFT CABIN COOLING METHOD AND APPARATUS

[75] Inventor: Ray R. Steves, Chatsworth, Calif.
[73] Assignee: The Garrett Corporation, Los Angeles, Calif.
[22] Filed: Apr. 22, 1974
[21] Appl. No.: 463,214

[52] U.S. Cl. .......................... 62/87; 62/172; 62/402
[51] Int. Cl. .............................................. F25d 9/00
[58] Field of Search ........... 62/86, 87, 88, 172, 401, 62/402

[56] References Cited
UNITED STATES PATENTS

| | | | |
|---|---|---|---|
| 2,485,522 | 10/1949 | Anderson | 62/172 |
| 2,491,462 | 12/1949 | Wood | 62/402 |
| 2,618,470 | 11/1952 | Brown | 62/402 |
| 2,704,925 | 3/1955 | Wood | 62/172 |
| 2,734,443 | 2/1956 | Wood | 62/172 |
| 2,800,002 | 7/1957 | Seed | 62/402 |
| 2,871,672 | 2/1959 | Boydell | 62/172 |

Primary Examiner—William J. Wye
Attorney, Agent, or Firm—Alfons Valukonis; Albert J. Miller

[57] ABSTRACT

Aircraft cabin cooling method and apparatus wherein engine bleed inlet air is utilized as the power source. The bleed inlet air is led sequentially through a fluid flow restrictor, a pressure regulating valve, an air-to-air heat exchanger, and a cooling expansion turbine to the cabin. A tip driven fan of an air turbine, which is positioned to draw cooling ram air through the heat exchanger to cool the inlet air, is connected for driving by the cooling turbine. During operation periods when shaft power available from the energy of expansion of cooled inlet air in the cooling turbine is insufficient to drive the fan to achieve the cabin cooling requirements, additional shaft power is provided by supplying inlet air to the air turbine in response to a predetermined inlet pressure which also drives the fan to assist the cooling turbine in maintaining the cabin cooling requirements.

29 Claims, 3 Drawing Figures

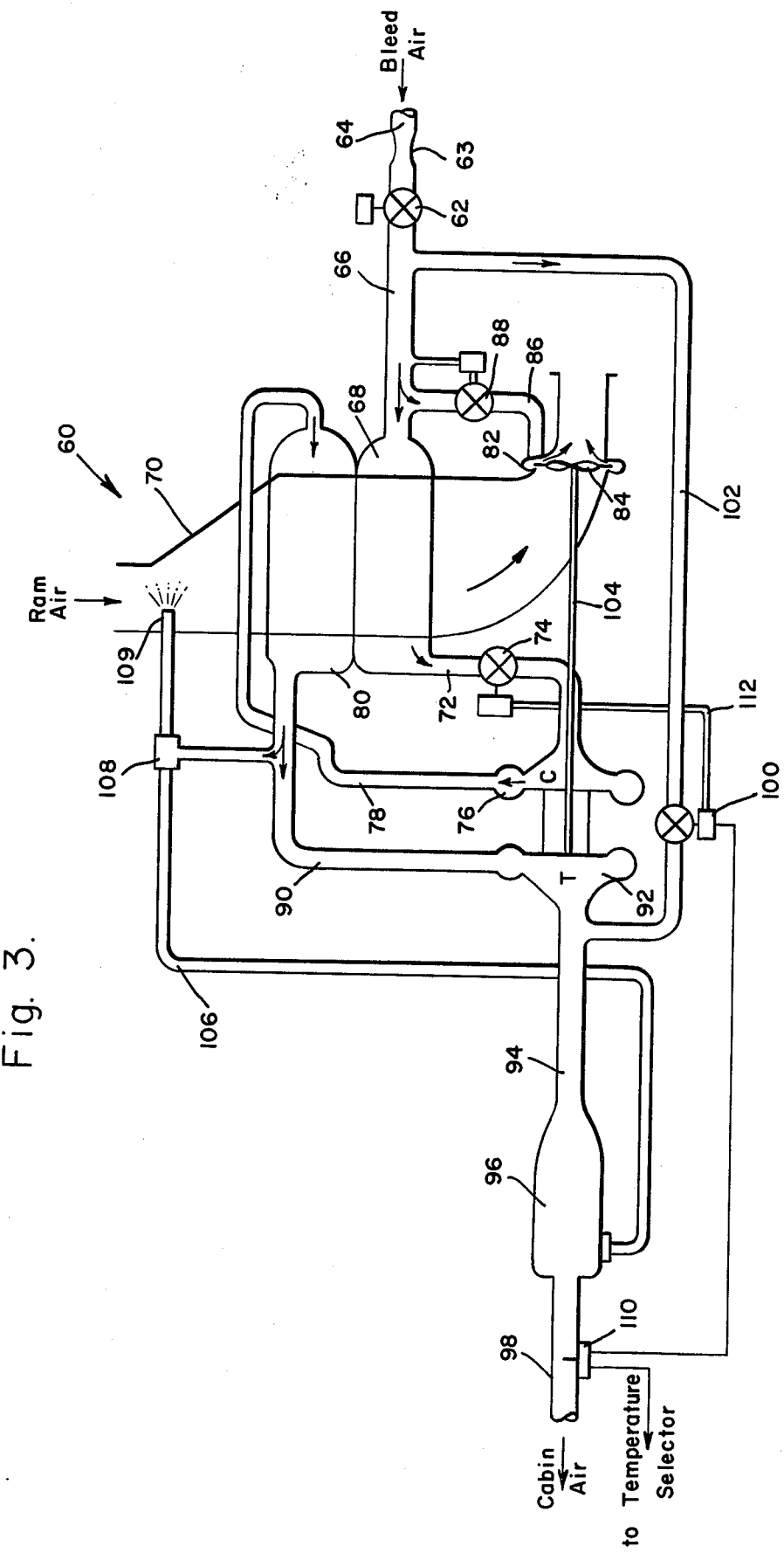

AIRCRAFT CABIN COOLING METHOD AND APPARATUS

BACKGROUND OF THE INVENTION

When aircraft, especially hover aircraft, utilizing gas turbine or turbojet engines are at ground idle power, flat pitch operation, idle descent, holding or hovering, the air supply pressure from such engines is low, and satisfactory cooling or aircfaft cabins or compartments by systems dependent on the engine air supply pressure is difficult to achieve. Heretofore, during such periods of aircraft operation, some prior cooling systems called for higher engine power output to increase the air supply pressure to achieve the desired cooling, resulting in fuel economy sacrifice, and increase in control complexity. In other systems, such components as the heat exchanger and cooling turbine were oversized to compensate for the low pressure supply conditions, thus adding cost and weight.

Prior art devices are disclosed in U.S. Pat. Nos. 2,772,621 to Arnoldi; 2,916,890 to Stein; 2,958,202 to Green; 2,959,028 to Beggs; 2,963,879 to Paravicini; 3,043,118 to McLafferty; 3,052,106 to Sampietro et al; 3,080,728 to Groves et al; 3,153,916 to Schumacher; 3,177,676 to Abrahams; 3,177,679 to Quick et al; 3,289,436 to Groves et al; 3,428,242 to Rannenberg; 3,511,161 to Schindelman; and 3,587,246 to Howard.

SUMMARY OF THE INVENTION

Thus, a main object of the invention is the provision of an aircraft cabin cooling method and apparatus that utilizes engine bleed air and provides the required cabin cooling even at low engine power operation with low air supply pressures without utilizing cooling system components, such as heat exchangers and cooling turbines of increased dimensions.

Accordingly, there is provided method and apparatus wherein inlet air is cooled, then expanded to an aircraft cabin, the energy expansion of the cooled inlet air is used to effect cooling of the inlet air, and additional energy is utilized to assist in cooling the inlet air when the energy of expansion of the cooled inlet air is insufficient to effect the cooling to maintain the cabin cooling requirements.

The present invention eliminates the disadvantages of prior aircraft cabin cooling systems. No special engine controls are required. The fuel penalty is reduced, and operation at low engine power output to achieve the desired cabin cooling is possible.

BRIEF DESCRIPTION OF THE DRAWINGS

FIG. 3 is a schematic showing of yet another embodiment of the invention.

DETAILED DESCRIPTION OF THE PREFERRED EMBODIMENTS

Figure 1:
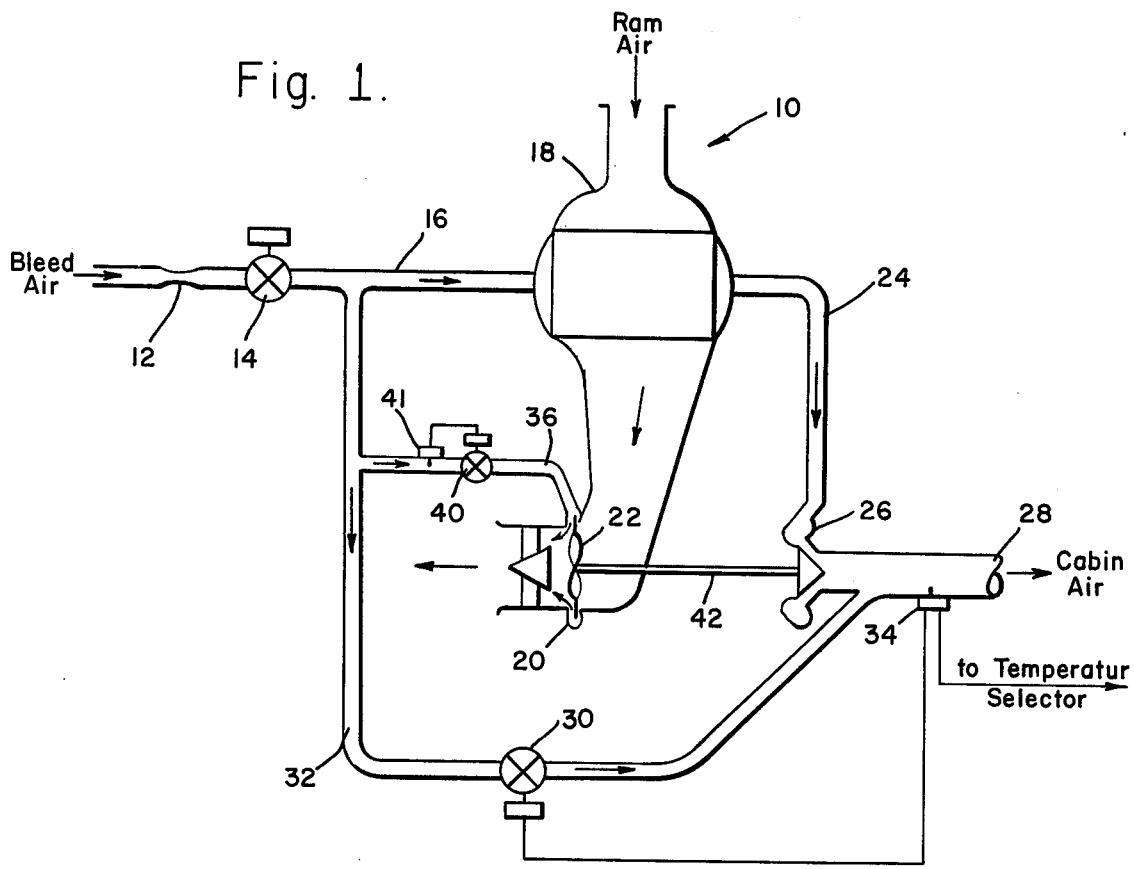
FIG. 1 is a schematic showing of one embodiment of the present invention.

Reference is now made to FIG. 1 wherein there is shown one embodiment of the cabin cooling apparatus of the present invention. Cooling apparatus 10 is provided with a venturi restriction 12 which is adapted for connection to a source of pressurized inlet air, such as the air bleed system of an aircraft engine (not shown). Restriction 12 serves to limit the maximum bleed air flow available from the engine (not shown). A pressure regulator and shut-off valve 14 connects the restriction 12 through conduit 16 to a heat exchanger 18, which could be of the air-to-air type. Heat exchanger 18 is provided with an air turbine 20 having a tip driven fan 22 for passing cooling ram air through heat exchanger 18 to effect cooling of inlet air. From heat exchanger 18 the cooled inlet air is conveyed by means of conduit 24 to a cooling expansion turbine 26. A conduit 28 connects turbine 26 with the aircraft cabin or compartment (not shown) to be cooled. A valve 30 is positioned in a conduit 32 connecting conduits 16 and 28 for mixing inlet air with the cooled inlet air from turbine 26 to regulate the temperature of air flowing to the cabin. Valve 30 can be controlled manually or automatically in response to sensing signals from a temperature sensor 34 situated in conduit 28, and a temperature selector (not shown), located for example, in the cabin. Valve 30 can be, for example, of the electrically actuated type. A conduit 36, having a pressure responsive valve 40, connects conduit 32 to turbine 20. Valve 40 is an on-off type valve, adapted to open when the pressure in conduit 32 is below a predetermined amount, and to close when pressure is above this amount. A pressure sensor 41 inserted in conduit 36 upstream of valve 40 provides the signals for actuating valve 40. A shaft 42 interconnects fan 22 and turbine 26.

In operation of the embodiment of FIG. 1, typically, bleed air from the engine source is provided at a temperature of 370°F and a pressure of 36 psia. In passing through restriction 12 the pressure is regulated to 35.98 psia. Further regulation of the pressure can be made by means of valve 14 and the pressure becomes, for example, 35.78 psia. After passing through heat exchanger 18 the pressure becomes 34.78 psia and the temperature of the air is at 121°F. When the air passes through turbine 26 the temperature drops to −7°F (DAR), and the pressure to 15.1 psia. Valve 30 can be opened to allow warm air from conduit 32 to mix with the cooled air from turbine 26 to raise its temperature to 33°F. If the pressure in conduit 36 should drop to about 26 psia, valve 40 opens in response to a signal from sensor 41 sensing the pressure drop, and allows bleed air to flow to turbine 20 which helps turbine 26 drive fan 22 to provide greater efficiency, and at the same time increase the cooling airflow through heat exchanger 18, improving its cooling effectiveness. Normally, at times when the pressure in conduit 36 is above this pressure, valve 40 remains closed.

Figure 2:
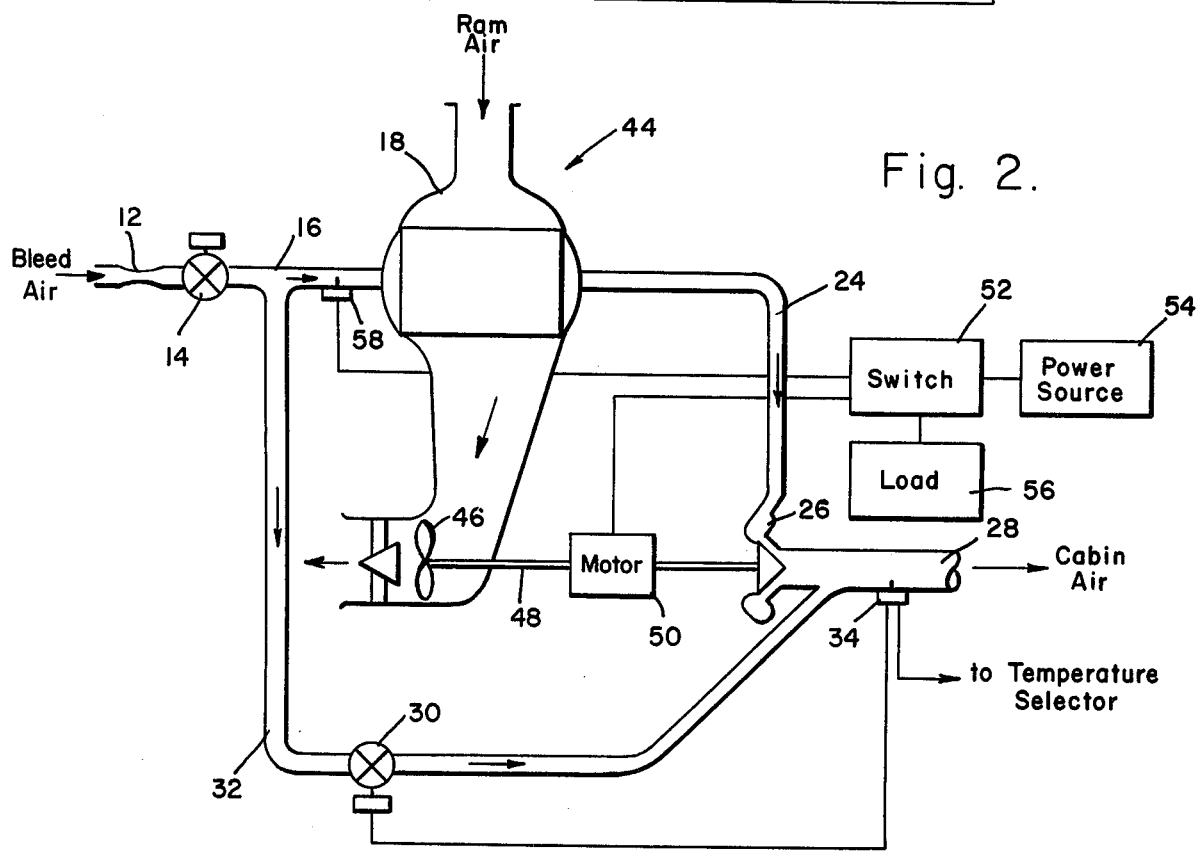
FIG. 2 is a schematic showing of another embodiment of the invention.

Reference is now made to FIG. 2 wherein another embodiment of the invention is illustrated. The cooling apparatus 44 uses parts similar to those used in the embodiment of FIG. 1, and like numerals serve to designate like parts. Heat exchanger 18 is now provided with a fan 46 for conveying cooling ram air through the heat exchanger 18 to cool the inlet air. One end of a shaft 48 of an electric motor 50 is connected to fan 46 and the other end is connected to turbine 26. A switch 52 is arranged to connect motor 50, either to a power source 54, or a load 56, in response to signals generated by a pressure responsive sensor 58 positioned in conduit 16. Motor 50 could be an induction motor, or like device, which can also serve as an electric generator when rotated to supply auxiliary electrical power to the aircraft, when connected to load 56. Load 56 can be the aircraft electrical distribution system, and power source 54 can be the aircraft battery and generator arrangement, for example.

Operation of the embodiment of FIG. 2 is somewhat similar to the operation of the embodiment of FIG. 1. In flight, when the aircraft bleed inlet air pressure is say, above 26 psia, turbine 26 turns motor 50 and fan 46, which draws cooling air through heat exchanger 18 in sufficient amount to cool the inlet air to satisfy the cabin cooling requirements. As long as the inlet air pressure in conduit 16 remains above 26 psia, sensor 58 maintains switch 52 positioned to connect motor 50, which now serves as a generator, to load 56. This feature is very desirable in small aircraft, such as executive, private, and helicopter aircraft, where electrical power is often limited and becomes critical in supply when loss of one generator occurs, for example. Thus, when motor 50 is connected to load 56, and functions as an electrical power generator, not only can adequate cooling inlet air be supplied to the aircraft cabin, but standby or auxiliary electrical power can also be provided to the aircraft electrical system. It will also be appreciated that this feature is useful in cases where the weight and cost of an auxiliary gas turbine for emergency power supply purposes cannot be tolerated on aircraft.

However, when the inlet air pressure can no longer satisfy the cabin cooling requirements, such as, for example, when the pressure in conduit 16 drops below 26 psia, sensor 58 generates a signal which positions switch 52 to connect power source 54 to motor 50. Motor 50 now receives electrical energy, and assists turbine 26 to turn fan 46 faster to draw more cooling air through heat exchanger 18, thus providing the required cabin cooling. It will be appreciated that in cases when the inlet air pressure is extremely low, some cabin cooling, though little, can still be provided.

Reference is now made to FIG. 3 wherein there is illustrated another embodiment of the present invention. Cooling apparatus 60 has a pressure regulator and shut-off valve 62 and venturi restriction 63 adapted to be connected by conduit 64 to the source of pressurized inlet air, such as the air bleed system of the aircraft engine (not shown). A conduit 66 connects valve 62 to a primary heat exchanger 68 of a heat exchanger arrangement 70. Heat exchanger 68 can be of the air-to-air type. A conduit 72, which is provided with a valve 74, connects heat exchanger 68 to an air compressor 76. Compressor 76 can be, for example, of the centrifugal type. A conduit 78 connects compressor 76 to another, or secondary heat exchanger 80, which could also be of the air-to-air type. Heat exchanger arrangement 70 is provided with an air turbine 82 having a tip driven fan 84 for passing cooling ram air through heat exchangers 68 and 80 to effect cooling of compressed inlet air from compressor 76. A conduit 86 having a pressure responsive valve 88, connects conduit 66 to turbine 82. Valve 88 is an on-off valve adapted to open when the pressure in conduit 66 is below a predetermined amount, and to close when presure is above this amount. From heat exchanger 80 inlet air is conveyed by means of conduit 90 to a cooling expansion turbine 92. A conduit 94 interconnects turbine 92 with a conventional water separator 96 of the centrifugal coalescer type, which can be driven by the aircraft engine (not shown). A conduit 98 connects water separator 96 with the aircraft cabin (not shown) or compartment to be cooled. A valve 100 is positioned in a conduit 102 connecting conduits 66 and 94 for mixing inlet air with the cooled inlet air to regulate the temperature of air flowing to the cabin. A shaft 104 interconnects compressor 76, fan 84, and turbine 92. Water collected in the water separator 96 is conveyed by conduit 106 to a spray 108 and sprayed by means of nozzle 109 into the path of the ram inlet air of the heat exchanger arrangement 70 where the water re-evaporates and increases the cooling effectiveness of the heat exchangers 68 and 80. Valve 100 can be controlled manually or automatically in response to sensing signals from the temperature sensor 110 positioned in conduit 98 and a temperature selector (not shown) located in the aircraft cabin. Valve 100 could be of the electrically or hydraulically actuated type. Valve 74 is illustrated as connected to valve 100 by means of a hydraulic coupling conduit 112, which is intended to schematically illustrate that valves 74 and 100 are sequentially operated valves, and that they are actuated in different senses. Ordinarily, valve 74 is open to allow full flow of air from heat exchanger 68 to compressor 76, while valve 100 is closed. When valve 100 is opened to allow mixing of inlet bleed air with the cooled inlet air from turbine 92, valve 74 closes proportionately to reduce the amount of inlet air flow from heat exchanger 68 to compressor 76. Such valve arrangements are well known in the art and can be hydraulically, mechanically, or electrically actuated.

In operation, as an example, assume that bleed air is provided from the engine source at a temperature of 370°F and a pressure of 26 psia. Valve 62 could be positioned to regulate the pressure to say, 50 psia. In passing through heat exchanger 68 the air suffers a decrease in pressure of about 0.5 psia, and the temperature falls to 210°F. In compressor 76 the air is compressed to 43 psia and the temperature increase to 374°F. In passing through heat exchanger 80 the air suffers a slight decrease in pressure, of about 1.0 psia, and the temperature drops to 110°F. When the air passes through turbine 92 the temperature drops to −5°F(DAR) and the pressure to 15.1 psia. At this point, temperature control valve 100 can be sufficiently opened to provide warm bleed air to mix with the cool air from turbine 92 to raise the temperature of the air to 33°F. Valve 74 closes to proportionately reduce the flow of inlet air from heat exchanger 68 to compressor 76. When the air leaves water separator 96 on its way to the cabin, it would be at, say, 36.5°F and a pressure of 14.75 psia. If pressure from the bleed source should drop to below 26 psia, valve 88 opens in response to a corresponding drop in pressure in conduit 66 so that inlet bleed air flows to turbine 82 to drive fan 84 and to provide supplemental energy to drive shaft 104.

In FIG. 3 heat exchangers 68 and 80 are illustrated as arranged in series to the cooling medium. It will be appreciated that heat exchangers 68 and 80 could be arranged in parallel with respect to the cooling medium to provide equally satisfactory inlet air cooling.

While specific embodiments have been illustrated and described, it is to be understood that they are provided by way of example only, and that various modifications, alterations and changes can be made without departng from the invention, and that the invention is not to be construed as being limited thereto, but only by the proper scope of the following claims.

What I claim is:

1. Aircraft cabin cooling apparatus comprising:
   heat exchanger means for cooling inlet air with a cooling fluid medium;
   fluid expansion means connected to expand the cooled inlet air to the cabin;
   fluid conveying means connected for driving by said fluid expansion means to transport the fluid medium through said heat exchanger means to cool the inlet air in response to the energy of expansion of the cooled inlet air; and
   auxiliary drive means connected to drive said fluid conveying means in response to a predetermined inlet air pressure to assist said fluid expansion means in maintaining the cabin cooling requirements.

2. The apparatus set forth in claim 1 wherein said heat exchanger means comprises:
   air-to-air heat exchanger means.

3. The apparatus set forth in claim 1 wherein said fluid expansion means comprises:
   an air expansion turbine.

4. The apparatus set forth in claim 1 wherein said fluid conveying means comprises:
   fan means for passing cooling air through said heat exchanger means to cool the inlet air.

5. The apparatus set forth in claim 1 further comprising:
   fluid flow control means connected to regulate flow of inlet air from a source to said heat exchanger means.

6. The apparatus set forth in claim 1 further comprising:
   fluid flow control means connected to control flow of the inlet air from a source to the cabin to regulate cabin temperature.

7. The apparatus set forth in claim 5 wherein said fluid flow control means comprises:
   a fluid flow restrictor; and
   a valve interconnecting said fluid flow restrictor and said heat exchanger means.

8. The apparatus set forth in claim 1 wherein said heat exchanger means comprises:
   an air-to-air heat exchanger.

9. The apparatus set forth in claim 8 wherein said fluid conveying means comprises:
   a turbine having a tip driven fan connected to said fluid expansion means.

10. The apparatus set forth in claim 9 wherein said auxiliary drive means comprises:
    fluid pressure responsive fluid flow control means connected to drive said turbine with inlet air at the predetermined inlet air pressure.

11. The apparatus set forth in claim 8 wherein said fluid conveying means comprises:
    a fan connected to said fluid expansion means.

12. The apparatus set forth in claim 11 wherein said auxiliary drive means comprises:
    a motor interconnecting said fluid expansion means and said fan; and
    circuit means connected to drive said motor with a power source in response to the predetermined inlet air pressure.

13. The apparatus set forth in claim 12 wherein said motor comprises:
    an induction motor.

14. The apparatus set forth in claim 13 wherein said circuit means comprises:
    a sensor for generating signals in response to the inlet air pressure; and
    switch means for connecting said induction motor to a power source when the inlet air pressure is below a predetermined amount and to a load when the inlet air pressure is above the predetermined amount in response to said signals.

15. The apparatus set forth in claim 1 further comprising:
    water separator means interconnecting said fluid expansion means and the cabin for separating water from the cooled inlet air.

16. The apparatus set forth in claim 15 further comprising:
    spray means connected to spray water from said water separator means into the fluid medium of said heat exchanger means.

17. The apparatus set forth in claim 1 wherein said heat exchanger means comprises:
    first and second air-to-air heat exchangers.

18. The apparatus set forth in claim 17 further comprising:
    an air compressor connected to compress the inlet air flowing from said first heat exchanger to said second heat exchanger.

19. The apparatus set forth in claim 18 further comprising:
    fluid flow control means connected to control flow of inlet air and cooled inlet air to the cabin and said air compressor, respectively, to regulate cabin temperature.

20. The apparatus set forth in claim 19 wherein said driven fluid conveying means comprises:
    a turbine having a tip driven fan connected to said fluid expansion means.

21. The apparatus set forth in claim 20 wherein said auxiliary drive means comprises:
    fluid pressure responsive flow control means connected to drive said turbine with inlet air at the predetermined inlet air pressure.

22. Aircraft cabin cooling apparatus comprising:
    an air-to-air heat exchanger for cooling inlet air with ambient air;
    an expansion turbine connected to expand the cooled inlet air to the cabin;
    an air turbine having a tip driven fan positioned to convey the ambient air through said heat exchanger to cool the inlet air when driven, said fan being connected for driving to said expansion turbine;
    a fluid pressure responsive valve connected to control flow of inlet air to said air turbine at a predetermined inlet air pressure to assist driving of said fan;
    valve means connected to control flow of inlet air to the cabin to regulate cabin temperature;
    a fluid flow restrictor adapted for connection to a source of inlet air; and
    a valve connected to control flow of inlet air from said fluid flow restrictor to said heat exchanger, fluid pressure responsive valve, and valve means.

23. Aircraft cabin cooling apparatus comprising:
    an air-to-air heat exchanger for cooling inlet air with ambient air;
    an expansion turbine connected to expand the cooled inlet air to the cabin;

a fan positioned to convey the ambient air through said heat exchanger to cool the inlet air when driven;

an induction motor interconnecting said expansion means and said fan for simultaneous rotation;

a sensor for generating signals in response to the inlet air pressure;

a switch for connecting said induction motor to a power source when the inlet air pressure is below a predetermined amount and to a load when the inlet air pressure is above the predetermined amount in response to said signals;

valve means connected to control flow of inlet air to the cabin to regulate cabin temperature;

a fluid flow restrictor adapted for connection to a source of inlet air; and a valve connected to control flow of inlet air from said fluid flow restrictor to said heat exchanger and said valve means.

24. Aircraft cabin cooling apparatus comprising:

a first air-to-air heat exchanger for cooling inlet air with ambient air;

an air compressor connected to said first heat exchanger for compressing the cooled inlet air;

a second air-to-air heat exchanger connected to said air compressor for further cooling the cooled inlet air with the ambient air;

an expansion turbine connected to expand the further cooled inlet air to the cabin;

an air turbine having a tip driven fan positioned to convey the ambient air through said first and second heat exchangers to cool the inlet air when driven, said fan being connected for driving to said expansion turbine;

a fluid pressure responsive valve connected to control flow of inlet air to said air turbine at a predetermined inlet air pressure to assist driving of said fan;

valve means connected to control flow of inlet air and cooled inlet air to the cabin and said air compressor, respectively, to regulate cabin temperature;

water separator means interconnecting said fluid expansion means and the cabin for separating water from the cooled inlet air;

spray means connected to spray water from said water separator means into the ambient air conveyed through said first and second heat exchangers;

a fluid flow restrictor adapted for connection to a source of inlet air; and a valve connected to control flow of inlet air from said fluid flow restrictor to said first heat exchanger, fluid pressure responsive valve, and valve means.

25. An aircraft cabin cooling method comprising the steps of:

cooling inlet air;

expanding the cooled inlet air to the cabin;

utilizing the energy of expansion of the cooled inlet air to effect cooling of the inlet air; and utilizing additional energy to assist in cooling the inlet air when the energy of expansion of the cooled inlet air is insufficient to effect the cooling to maintain cabin cooling requirements.

26. The method of claim 25 further comprising the step of:

regulating the inlet air pressure.

27. The method of claim 25 further comprising:

supplying inlet air to the cabin to regulate cabin temperature.

28. The method of claim 25 wherein the step of utilizing additional energy comprises:

utilizing inlet air to assist in cooling the inlet air when the inlet air pressure is below a predetermined amount to maintain the cabin cooling requirements.

29. The method of claim 25 wherein the step of utilizing additional energy comprises:

utilizing electric motor power to assist in cooling the inlet air pressure is below a predetermined amount to maintain the cabin cooling requirement.

* * * * *